(12) United States Patent
Noirot et al.

(10) Patent No.: US 9,541,133 B2
(45) Date of Patent: Jan. 10, 2017

(54) ROLLING BEARING, NOTABLY FOR SHIP'S PROPELLER OR FOR WIND TURBINE

(71) Applicant: Aktiebolaget SKF, Göteborg (SE)

(72) Inventors: Jean-Baptiste Noirot, Avallon (FR); Jean-Baptiste Magny, Mige (FR); Cyril Bouron, Avallon (FR); Pascal Ovize, Chitry le Fort (FR)

(73) Assignee: AKTIEBOLAGET SKF, Gothenburg (SE)

( * ) Notice: Subject to any disclaimer, the term of this patent is extended or adjusted under 35 U.S.C. 154(b) by 555 days.

(21) Appl. No.: 14/059,970

(22) Filed: Oct. 22, 2013

(65) Prior Publication Data

US 2014/0112789 A1    Apr. 24, 2014

(30) Foreign Application Priority Data

Oct. 22, 2012  (FR) ...................... 12 60016

(51) Int. Cl.
*F16H 55/12* (2006.01)
*F16C 33/58* (2006.01)
*F03D 7/02* (2006.01)
*F16H 55/17* (2006.01)
*F16C 19/08* (2006.01)

(52) U.S. Cl.
CPC ........... *F16C 33/581* (2013.01); *F03D 7/0224* (2013.01); *F16H 55/12* (2013.01); *F16C 19/08* (2013.01); *F16H 2055/175* (2013.01); *F16H 2055/176* (2013.01); *Y02E 10/721* (2013.01); *Y10T 74/1993* (2015.01)

(58) Field of Classification Search
CPC ....... F03D 7/0224; F16C 33/581; F16C 19/08; F16H 55/12; F16H 2055/175; F16H 2055/176; Y10T 74/1993
See application file for complete search history.

(56) References Cited

U.S. PATENT DOCUMENTS

| 3,888,357 A | * | 6/1975 | Bauer | ..................... B66C 23/84 212/175 |
| 7,331,761 B2 | | 2/2008 | Hansen et al. | |
| 8,523,521 B2 | * | 9/2013 | Kawai | ................... F03D 7/0224 416/155 |
| 2011/0142631 A1 | | 6/2011 | Kawai et al. | |

(Continued)

FOREIGN PATENT DOCUMENTS

DE   102010010639 A1   9/2011
EP      2463521 A2      6/2012
(Continued)

*Primary Examiner* — Richard Edgar
(74) *Attorney, Agent, or Firm* — Bryan Peckjian; SKF USA Inc. Patent Dept.

(57) ABSTRACT

Rolling bearing (1) comprising an inner ring (3), an outer ring (2), at least one row of rolling elements which are arranged between raceways made on the rings (2, 3) and an ring gear (6) fixed to one of the rings (2). The ring gear (6) is formed of at least two independent gear segments (7, 8, 9, 10, 11, 12) which are each provided on their inner or outer peripheral surface with a plurality of meshing means (7b, 8b, 9b, 10b, 11b, 12b) and fixed only to one of either the inner or outer rings (3) of the rolling bearing (1), the circumference of the ring gear (6, 20) being substantially equal to the circumference of the combination of the independent gear segments.

8 Claims, 5 Drawing Sheets

(56) References Cited

U.S. PATENT DOCUMENTS

2012/0148411 A1\* 6/2012 Andersen .............. F03D 7/0224
  416/153
2013/0039768 A1\* 2/2013 Iffland ................. F03D 11/0008
  416/155

FOREIGN PATENT DOCUMENTS

EP        2474735 A2    7/2012
WO     2012072627 A1    6/2012

\* cited by examiner

ROLLING BEARING, NOTABLY FOR SHIP'S PROPELLER OR FOR WIND TURBINE

CROSS-REFERENCE TO RELATED APPLICATION

This application claims priority to French Patent Application No. FR1260016 filed on Oct. 22, 2012, the contents of which is fully incorporated herein by reference.

FIELD OF THE INVENTION

The present invention relates to the field of rolling bearings and notably relates to rolling bearings used in the field of ship's propellers or wind turbines.

BACKGROUND OF THE INVENTION

A "ship" means a high-tonnage vessel intended for maritime shipping, such as merchant shipping (oil tankers, container ships, fishing boats, etc.), warships (aircraft carriers, submarines, etc.) or alternatively large sailing boats or cruise liners. A ship's propeller typically takes the form of an assembly comprising an engine which drives the rotation of at least one propeller screw, this propeller being fixed to the hull of the ship, notably at the rear of the ship. In order to steer the ship, it is known practice to use what is known as a "pitch bearing" in order to orientate the propeller with respect to the hull of the ship.

A wind turbine generally comprises a nacelle, mounted for rotation on a mast and enclosing a generator intended to produce electrical energy, a rotor driven by the wind and provided with a hub supporting at least two blades, and a large-sized rolling bearing supporting the rotor.

In order to control the load supplied to the rotor, it is common to use a pitch bearing in order to orientate the blades of the wind turbine about their longitudinal axis according to the wind direction.

Such a rolling bearing comprises an outer ring fixed to the hub, an inner ring fixed to one of the blades and a plurality of rolling elements, such as balls, arranged between the inner and outer rings.

The rolling bearing comprises a ring gear provided with a peripheral inner gear teeth intended to mesh with an actuator via a gearwheel. It is known practice to form the internal gear teeth directly on the inner surface of the inner ring.

However, such a rolling bearing referred to as a pitch bearing works only when it is necessary to orientate the blade or the propeller and performs small rotations, such that only a small portion of the gear teeth is used. In addition, such a rolling bearing may be stationary for long periods of time, thus causing accelerated degradation.

As the gear teeth wears, it becomes necessary to dismantle the inner ring, or even the rolling bearing in its entirety, which is a relatively complex and expensive operation.

Reference may be made to document EP 2 474 735 which describes a device for mounting a blade pitch gear on a pitch bearing of a wind turbine comprising an inner ring, an outer ring and a gear which is fixed to the inner ring by a plurality of fixing means.

Although such a device allows only the gear to be changed in the event of wear, the plurality of fixing means generates great overall external dimensions and is complicated to achieve.

Reference may also be made to document U.S. Pat. No. 7,331,761 which describes a blade pitch bearing for a wind turbine comprising an inner ring, an outer ring and two rows of rolling elements which are arranged between the rings. The inner surface of the inner ring is provided with a plurality of teeth over a portion less than 200° and intended to mesh with a gear in order to orientate the blades of the wind turbine.

However, as the gear teeth wears, it then becomes necessary to remove the inner ring in its entirety.

It is therefore an object of the present invention to remedy these disadvantages.

More specifically, the present invention seeks to provide a rolling bearing that is easy to manufacture, to fit, is of small overall external dimensions, and allows the meshing means to be removed quickly and economically.

SUMMARY OF THE INVENTION

The invention concerns a rolling bearing comprising an inner ring, an outer ring, at least one row of rolling elements which are arranged between raceways made on the said rings and a ring gear fixed to one of the said rings.

The ring gear is formed of at least two independent gear segments which are each provided on their inner or outer peripheral surface with a plurality of meshing means and fixed only to one of either the inner or outer rings of the rolling bearing, the circumference of the ring gear being substantially equal to the circumference of the combination of the independent gear segments.

Thus, the damaged gear segment can be removed without removing the other, undamaged, gear segments. Nor is there any longer any need to remove in its entirety the inner or outer ring to which the independent gear segments are fixed, or even the rolling bearing in its entirety, allowing a simplified disassembling.

Advantageously, each gear segment comprises an axial portion extending axially from a radial surface of the gear segment.

Each of the axial portions may comprise at least one radial drilling intended to cooperate with an attachment means to one of the inner or outer rings.

According to one embodiment, each gear segment comprises a radial portion extending radially from the axial portion in the opposite direction to the radial teeth.

Each of the radial portions may comprise at least one axial drilling intended to cooperate with an attachment means to one of the inner or outer rings.

According to one embodiment, the ring gear is fixed to the peripheral inner surface of the inner ring, the said independent gear segments each being provided on their inner peripheral surface with a plurality of meshing means.

According to one embodiment, the circumference of the ring gear is less than or equal to 360°, preferably less than or equal to 120°. Indeed, when the blade is orientated, the rolling bearing makes small rotations such that only a small portion of the gear teeth is used. Use of a ring gear with a circumference of 120°or less is then sufficient and allows a significant reduction in materials.

For example, the ring gear is formed of four independent gear segments each extending circumferentially over substantially 90°, or of six independent gear segments each extending circumferentially over substantially 60°.

Advantageously, the meshing means are radial teeth, for example designed to cooperate with a gearwheel, such as a pinion gear.

According to a second aspect, the invention concerns a wind turbine comprising a nacelle, mounted on a mast and enclosing a generator intended to produce electrical energy, a rotor provided with a hub supporting at least two blades and a rolling bearing as described hereinabove mounted between the hub and a blade.

According to another aspect, the invention relates to a ship comprising a hull, a propeller enclosing an engine and propeller screws, and a rolling bearing as described hereinabove mounted between the hull and the propeller.

BRIEF DESCRIPTION OF THE FIGURES

The present invention will be better understood from reading the description of a number of embodiments which are given by way of nonlimiting examples and illustrated by the attached drawings in which.

DETAILED DESCRIPTION OF THE INVENTION

Figure 1:
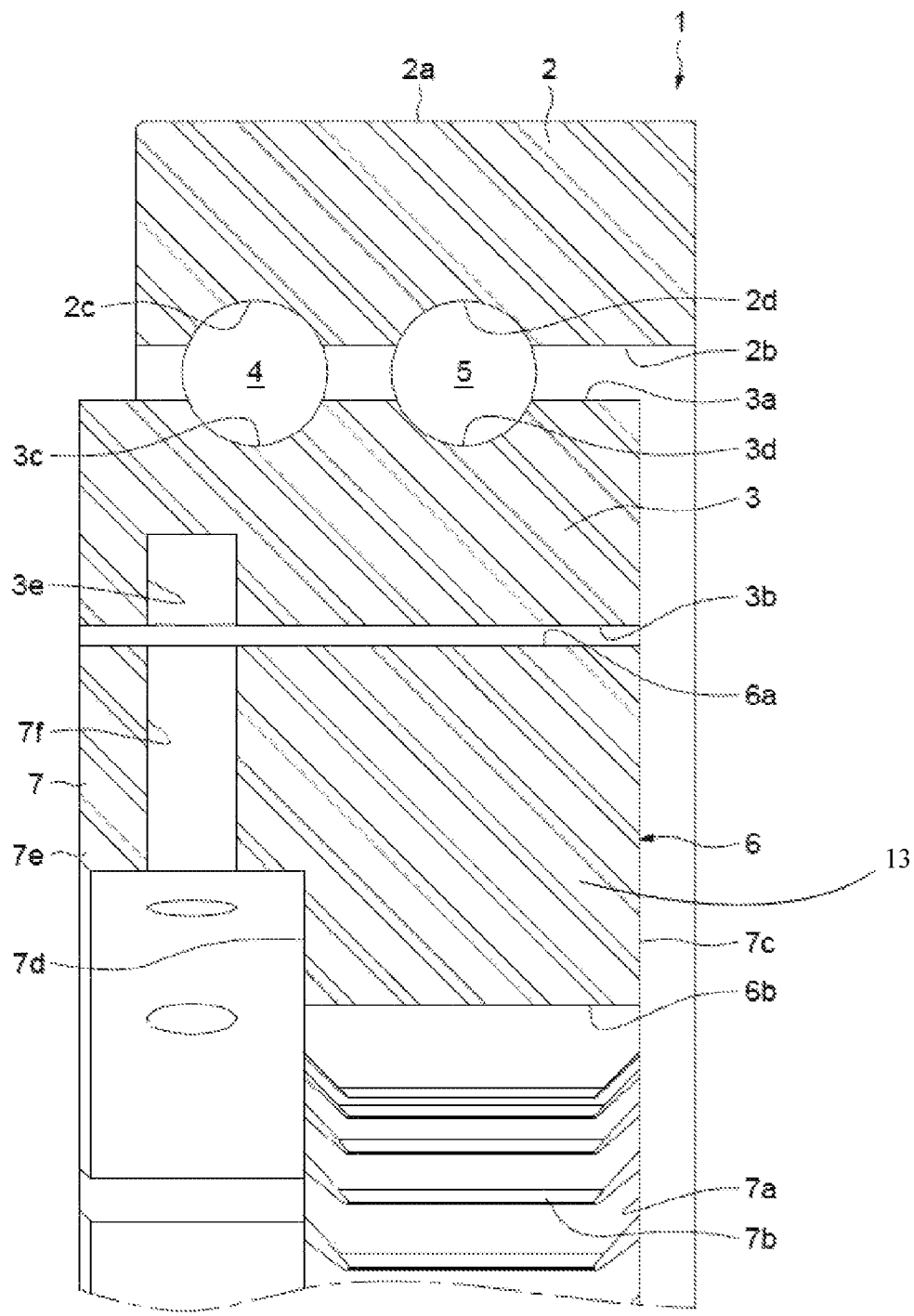
FIG. 1 is a view in axial section of a rolling bearing according to a first embodiment of the invention.
Figure 2:
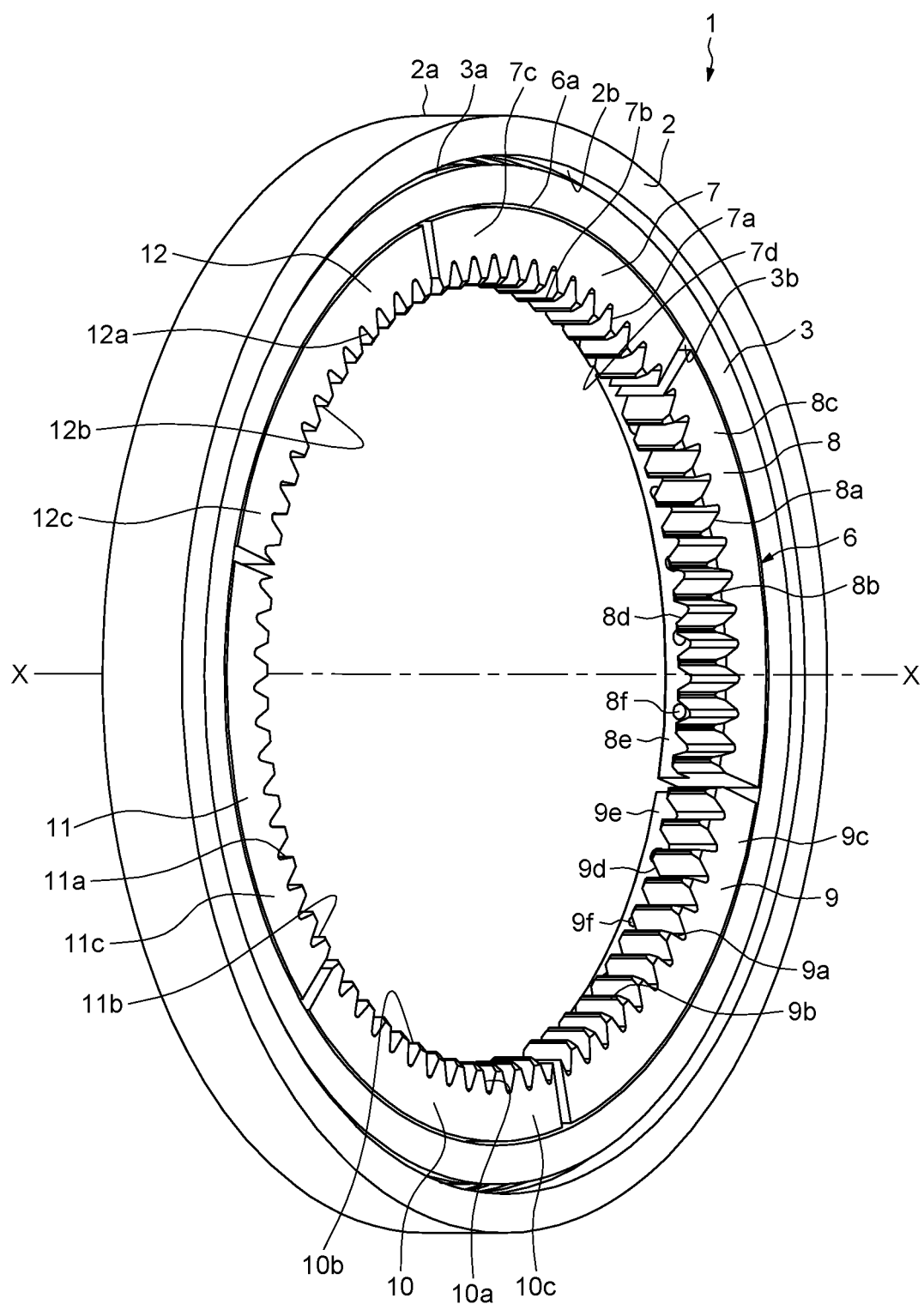
FIG. 2 is a perspective view of the rolling bearing according to FIG. 1.
Figure 3:
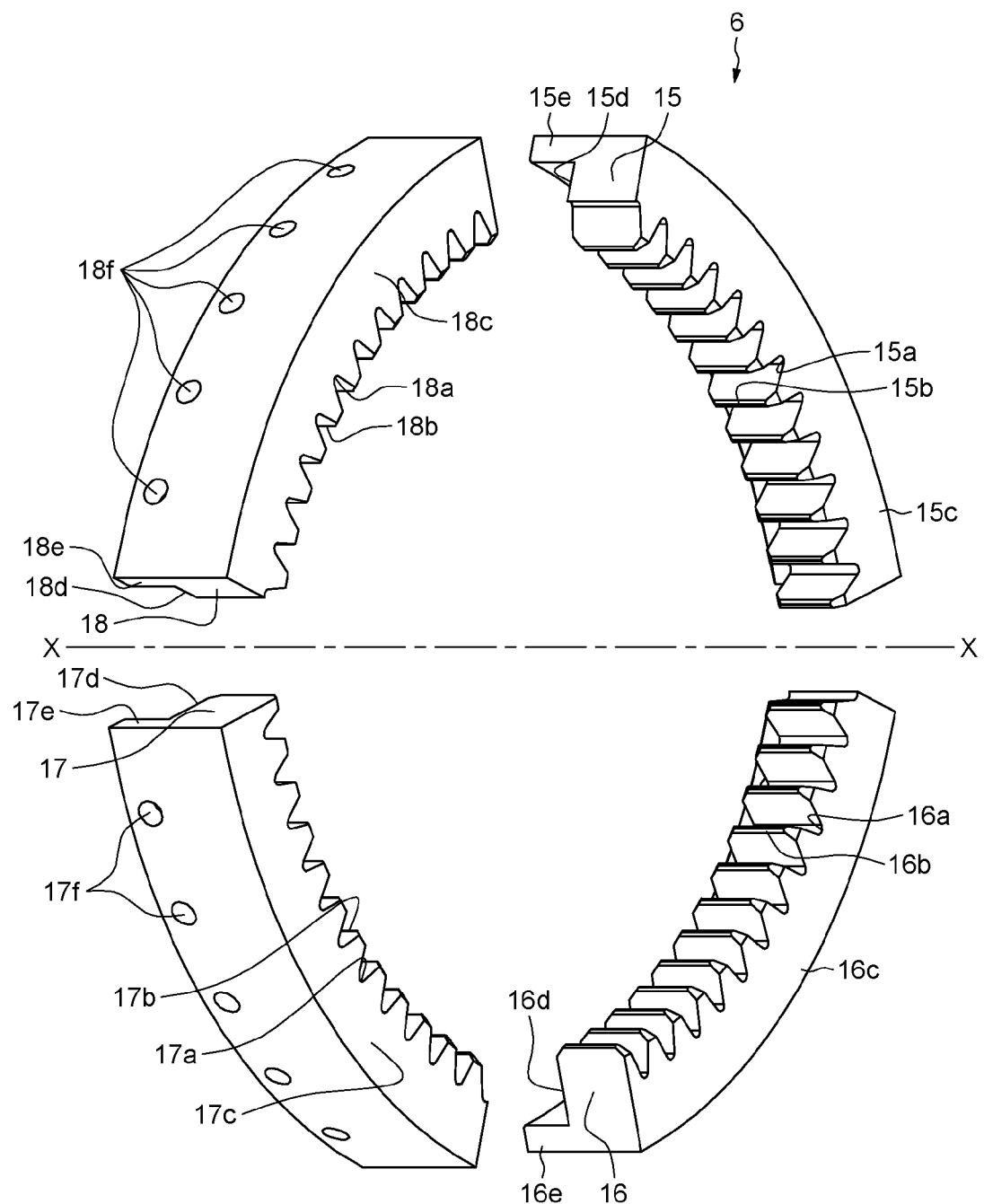
FIG. 3 is a perspective view of the ring gear according to another embodiment.

The rolling bearing, of axial axis X-X, referenced 1 in FIGS. 1 to 3, is a rolling bearing known as a pitch bearing intended to be used in a wind turbine (not depicted).

By way of non-limiting example, a wind turbine comprises a nacelle placed at one end of a mast and a rotor provided with a hub supporting at least two blades which are powered by the wind in order to produce electrical energy.

The rolling bearing 1 is designed to be placed between the hub of the rotor and one of the blades and used to orientate the blades of the wind turbine about their longitudinal axis according to the wind direction.

The rolling bearing 1 comprises an outer ring 2 designed to be fixed to the hub (not depicted) by its cylindrical outer surface 2a or by one of its faces, an inner ring 3 designed to be fixed to one of the blades (not depicted), two rows of rolling elements 4, 5, here produced in the form of balls, arranged between the inner 3 and outer 2 rings and a cage (not depicted) for maintaining the circumferential spacing between the rolling elements of each row 4, 5. As an alternative, it is possible to conceive of a single row of rolling elements which are arranged between the inner 3 and outer 2 rings.

The outer 2 and inner 3 rings are solid. What is meant by "solid ring" is a ring the shape of which is obtained by machining with the removal of chips (turning, grinding) from tubes, bar stock, forged and/or rolled blanks.

The outer ring 2 comprises, at its bore 2b, two deep-groove raceways 2c, 2d which in cross section have a concave inner profile suited to the rolling elements 4, 5, the said raceways 2c, 2d facing radially inwards. The inner ring 3 also comprises, at its cylindrical outer surface 3a, two deep-groove raceways 3c, 3d which in cross section have a concave internal profile suited to the rolling elements 4, 5, the said raceways 3c, 3d being directed radially outwards. The raceway 2c of the outer ring 2 is aligned with the raceway 3c of the inner ring 3 so as to accommodate the rolling elements of the first row 4 of rolling elements. The raceway 2d of the outer ring 2 is aligned with the raceway 3d of the inner ring 3 so as to accommodate the rolling elements of the second row 5 of rolling elements.

In another preferred embodiment of the invention (which has not been depicted), each raceway 2c, 2d, 3c, 3d comprises two tracks for the rolling elements, these two tracks having the same radius but different centres so that each row of rolling elements adopts what is known as the "four-point contact" configuration.

The rolling bearing 1 comprises a ring gear 6 of annular shape extending circumferentially over 360° and designed to be fixed to one of the inner or outer rings. As an alternative, it is possible to conceive a ring gear that has a circumference of less than 360°, or even of 120° or less.

In the example illustrated, the outer surface 6a of the ring gear 6 is fixed to the cylindrical inner surface 3b of the inner ring 3. As an alternative, the inner surface 6b of the ring gear 6 may be fixed to the cylindrical outer surface 2a of the outer ring 2. In that case, the inner ring 3 would be fixed to the hub and the outer ring 2 would be fixed to one of the blades.

The ring gear 6 illustrated in detail in FIG. 2 is formed by a plurality of gear segments 7, 8, 9, 10, 11, 12 which are independent and identical, there being for example six of these, each extending circumferentially over substantially 60°. It will be noted that a small circumferential gap is left between two adjacent gear segments.

It will be noted that a number of segments higher than or equal to two could be provided. The gear segments may have circumferential lengths that differ from one another, while at the same time having a total circumference substantially equal to the circumference of the ring gear. The total circumference of the ring gear corresponds to the sum of the circumferences of each of the independent gear segments. By way of non-limiting example, provision could be made for the ring gear to be formed of two independent gear segments, each having a circumference of substantially 45°, so that the ring gear has a circumference of 90°.

In the example illustrated in FIG. 2, the plurality of independent gear segments 7, 8, 9, 10, 11, 12 form a ring gear with a circumference substantially equal to 360°.

As illustrated in FIG. 2, each of the independent gear segments 7, 8, 9, 10, 11, 12 is provided on its inner peripheral surface 7a, 8a, 9a, 10a, 11a, 12a with a plurality of radial teeth 7b, 8b, 9b, 10b, 11b, 12b which are designed to mesh with a gearwheel (not depicted) of complementary shape. As an alternative, any other form of intermesh allowing the gear segments to mesh with the gearwheel could be provided. The independent gear segments 7, 8, 9, 10, 11, 12 are fixed only to the inner surface 3b of the inner ring 3 of the rolling bearing 1 and are not fixed to one another. As an alternative, provision could be made for the independent gear segments 7, 8, 9, 10, 11, 12 to be fixed only to the outer surface 2a of the outer ring 2 of the rolling bearing 1.

Each gear segment 7, 8, 9, 10, 11, 12 comprises two lateral radial surfaces 7c, 7d, 8c, 8d, 9c, 9d, 10c, 10d, 11c, 12d.

Only segment 7 will be described hereinafter, it being understood that segments 8, 9, 10, 11 and 12 are identical to segment 7.

The gear segment 7 comprises an axial portion 7e (referred to as the first axial section in the claims) extending axially from the second lateral radial surface 7d of the gear segment 7, opposite to the first lateral surface 7c. The outside diameter of the axial portion 7e is substantially identical to the outside diameter of the gear segment 7 and the inside diameter of the axial portion 7e is greater than the diameter of the interior surface 7a of the gear segment 7. As illustrated, the axial portion 7e comprises a plurality of radial drillings 7f each one designed to cooperate with an attachment means (not depicted) cooperating with a corresponding radial drilling 3e made in the inner surface 3b of the inner ring 3. The attachment means may, for example, be a screw-fastener means, such as screw-nut systems, or rivets.

Alternatively, these attachment means may be limited to a positioning means, such as centring pegs or a supporting shoulder.

The embodiment illustrated in FIG. 3, in which the same elements have the same references, differs from the embodiment illustrated in FIGS. 1 and 2 in terms of the number of gear segments.

As illustrated in FIG. 3, the ring gear 6 is formed of four gear segments 15, 16, 17, 18 which are identical and independent from one another, each extending circumferentially over substantially 90°.

Each of the gear segments 15, 16, 17, 18 is provided on its inner peripheral surface 15a, 16a, 17a, 18a with a plurality of radial teeth 15b, 16b, 17b, 18b intended to mesh with a gearwheel (not depicted) of complementary shape. As an alternative, any other form of intermesh that allows the gear segments to mesh with the gearwheel could be provided. The independent gear segments 15, 16, 17, 18 are fixed only to the inner ring 3 of the rolling bearing 1 and are not fixed to one another.

Each of the gear segments 15, 16, 17, 18 is provided on its inner peripheral surface 15a, 16a, 17a, 18a with a plurality of radial teeth 15b, 16b, 17b, 18b intended to mesh with a gearwheel (not depicted) of complementary shape. As such, the inner peripheral surface 15a, 16a, 17a, 18a is the dedendum circle of the plurality of radial teeth 15b, 16b, 17b, 18b. As an alternative, any other form of intermesh that allows the gear segments to mesh with the gearwheel could be provided. The independent gear segments 15, 16, 17, 18 are fixed only to the inner ring 3 of the rolling bearing 1 and are not fixed to one another.

Figure 4:
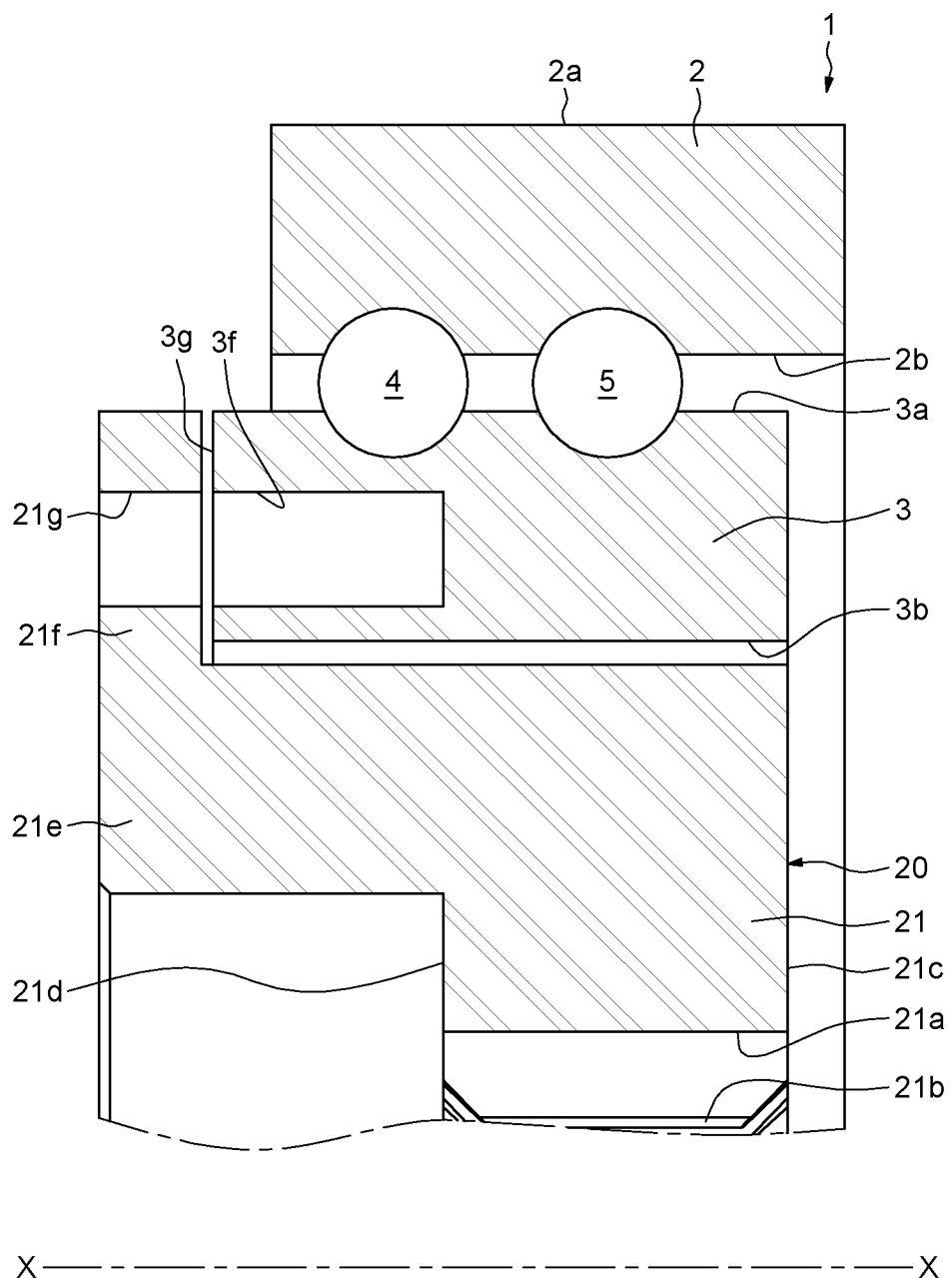
FIG. 4 is a view in axial section of a rolling bearing according to a second embodiment of the invention.
Figure 5:
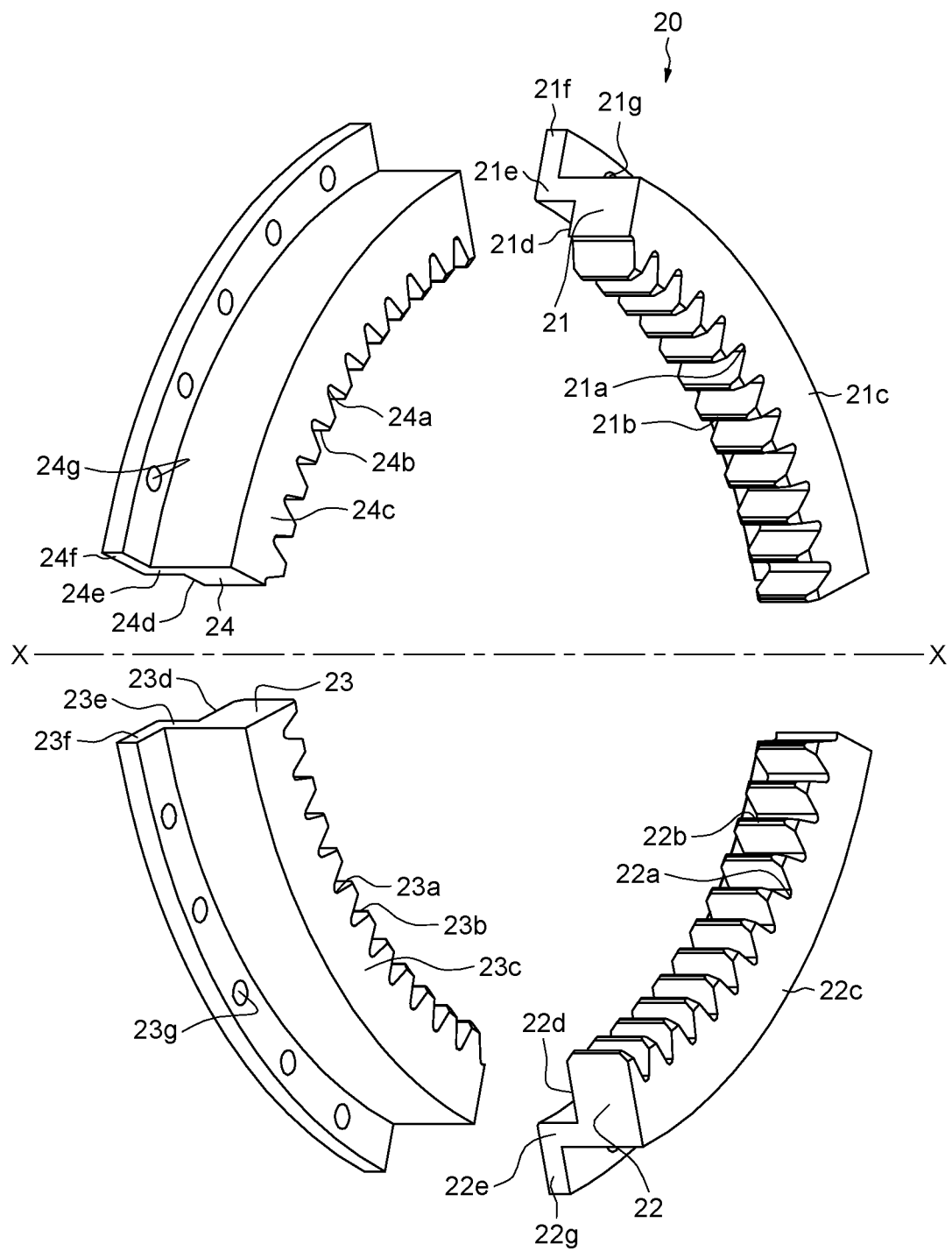
FIG. 5 is a perspective view of the ring gear in the rolling bearing of FIG. 4.

The embodiment illustrated in FIGS. 4 and 5, in which the same elements have the same references, differs from the embodiment illustrated in FIGS. 1 to 2 in terms of the shape of the gear segments.

As illustrated in FIGS. 4 and 5, the ring gear 20, illustrated in detail in FIG. 5, is formed of a plurality of gear segments 21, 22, 23, 24 which are identical and independent of one another, there being for example four of these, each extending circumferentially over substantially 90°. The independent gear segments 21, 22, 23, 24 are fixed only to the inner surface 3b of the inner ring 3 of the rolling bearing 1 and are not fixed to one another.

It will be noted that a number of gear segments greater than or equal to two may be provided. As an alternative, the gear segments may have different circumferential lengths, while at the same time forming a ring gear of substantially 360°.

As illustrated in FIG. 5, each of the independent gear segments 21, 22, 23, 24 is provided on its inner peripheral surface 21a, 22a, 23a, 24a with a plurality of radial teeth 21b, 22b, 23b, 24b designed to mesh with a gearwheel (not depicted) of complementary shape. As an alternative, it is possible to provide any other form of intermeshing that allows the gear segments to mesh with the gearwheel.

Each gear segment 21, 22, 23, 24 comprises two lateral radial surfaces 21c, 21d, 22c, 22d, 23c, 23d, 24c, 24d.

Each gear segment 21, 22, 23, 24 comprises an axial portion 21e, 22e, 23e, 24e extending axially from the second lateral radial surface 21d, 22d, 23d, 24d of the gear segment 21, 22, 23, 24, opposite to the first lateral surface 21c, 22c, 23c, 24c. The outside diameter of the axial portion 21e, 22e, 23e, 24e is substantially identical to the outside diameter of the corresponding gear segment 21, 22, 23, 24, and the inside diameter of the axial portion 21e, 22e, 23e, 24e is greater than the diameter of the inner surface 21a, 22a, 23a, 24a of the corresponding gear segment 21, 22, 23, 24. As illustrated, each gear portion 21, 22, 23, 24 comprises a radial portion 21f, 22f, 23f, 24f extending radially from the axial portion 21e, 22e, 23e, 24e in the opposite direction to the radial teeth 21b, 22b, 23b, 24b towards the outer ring 2. Each radial portion 21f, 22f, 23f, 24f comprises a plurality of axial drillings 21g, 22g, 23g, 24g each designed to cooperate with an attachment means (not depicted) cooperating with a corresponding axial drilling 3f made in a lateral radial surface 3g of the inner ring 3.

By virtue of the invention, as the gear teeth wears, it is easy to remove the damaged gear segment without removing the other, undamaged, gear segments and without fully removing the inner ring or even the rolling bearing in its entirety.

The special structure of the gear segments allows for ease of attachment to the inner ring, either radially or axially.

It will be noted that the rolling bearing 1 according to the invention could also be used in a high-tonnage ship (not depicted). A ship generally comprises a propeller comprising an engine and at least one propeller screw for propelling the ship. The propeller is mounted on the hull of the ship, notably at the rear of the ship, via the rolling bearing 1. As high-tonnage ships generally have no steering rudder, the rolling bearing 1 allows the propeller to be orientated with respect to the hull of the ship in order to steer the ship.

The invention claimed is:
1. A rolling bearing comprising:
an inner ring having a first axial end, a second axial end, and a cylindrical inner surface,
an outer ring,
at least one row of rolling elements disposed between the inner and outer rings, and
a ring gear fixed to the cylindrical inner surface of the inner ring, wherein the ring gear is formed of at least two independent gear segments, each of the at least two independent gear segments, when viewed in axial cross-section, having first and second axial sections adjacently located side-by-side so as not to radially overlap, the first axial section defining a first gear segment inner radius, the second axial section having first and second radially extending surfaces between which are located a plurality of teeth such that the plurality of teeth are located entirely on the second axial section and configured to extend radially inwardly therefrom, the plurality of teeth defining a dedendum circle forming a second gear segment inner radius, the first gear segment inner radius being greater than the second gear segment inner radius, the ring gear being completely radially overlapped by the inner ring such that, when viewed in axial cross-section, no portion of the ring gear extends axially past either of the first axial end or the second axial end of the inner ring in a direction away from the at least one row of rolling elements, a maximum outer diameter of the ring gear is equal to or less than a diameter of the cylindrical inner surface of the inner ring,
and wherein the circumference of the ring gear is substantially equal to the circumference of the combination of the at least two independent gear segments.

2. The rolling bearing according to claim 1, wherein the first axial section further comprises at least one radial drilling designed to cooperate with an attachment means provided on the inner ring.

3. The rolling bearing according to claim 2, wherein the circumference of the ring gear is less than or equal to 360°.

4. The rolling bearing according to claim 3, wherein the ring gear is formed of four independent gear segments each extending circumferentially over substantially 90°.

5. The rolling bearing according to claim 3, wherein the ring gear is formed of six independent gear segments each extending circumferentially over substantially 60°.

6. The rolling bearing according to claim 3, wherein the circumference of the ring gear is less than or equal to 120°.

7. A wind turbine comprising:
    a nacelle, mounted on a mast and enclosing a generator intended to produce electrical energy,
    a rotor provided with a hub supporting at least two blades, and
    a rolling bearing mounted between the hub and a blade, the rolling bearing including,
        an inner ring having a first axial end, a second axial end, and a cylindrical inner surface,
        an outer ring,
        at least one row of rolling elements disposed between the inner and outer rings, and
        a ring gear fixed to the cylindrical inner surface of the inner ring, wherein the ring gear is formed of at least two independent gear segments, each of the at least two independent gear segments, when viewed in axial cross-section, having first and second axial sections adjacently located side-by-side so as not to radially overlap, the first axial section defining a first gear segment inner radius, the second axial section having first and second radially extending surfaces between which are located a plurality of teeth such that the plurality of teeth are located entirely on the second axial section and configured to extend radially inwardly therefrom, the plurality of teeth defining a dedendum circle forming a second gear segment inner radius, the first gear segment inner radius being greater than the second gear segment inner radius, the ring gear being completely radially overlapped by the inner ring such that, when viewed in axial cross-section, no portion of the ring gear extends axially past either of the first axial end or the second axial end of the inner ring in a direction away from the at least one row of rolling elements, a maximum outer diameter of the ring gear is equal to or less than a diameter of the cylindrical inner surface of the inner ring, and wherein
    the circumference of the ring gear is substantially equal to the circumference of the combination of the independent gear segments.

8. A rolling bearing comprising:
an inner ring,
an outer ring having a first axial end, a second axial end, and a cylindrical outer surface,
at least one row of rolling elements disposed between the inner and outer rings, and
a ring gear fixed to the cylindrical outer surface of the outer ring, wherein the ring gear is formed of at least two independent gear segments, each of the at least two independent gear segments, when viewed in axial cross-section, having first and second axial sections adjacently located side-by-side so as not to radially overlap, the first axial section defining a first gear segment outer radius, the second axial section having first and second radially extending surfaces between which are located a plurality of teeth such that the plurality of teeth are located entirely on the second axial section and configured to extend radially outwardly therefrom, the plurality of teeth defining a dedendum circle forming a second gear segment outer radius, the first gear segment outer radius being less than the second gear segment outer radius, the ring gear being completely radially overlapped by the outer ring such that, when viewed in axial cross-section, no portion of the ring gear extends axially past either of the first axial end or the second axial end of the outer ring in a direction away from the at least one row of rolling elements, a minimum inner diameter of the ring gear is equal to or greater than a diameter of the cylindrical outer surface of the outer ring, and
wherein the circumference of the ring gear is substantially equal to the circumference of the combination of the at least two independent gear segments.

* * * * *